United States Patent
Keysar et al.

(10) Patent No.: US 9,379,543 B2
(45) Date of Patent: Jun. 28, 2016

(54) INTEGRATED CIRCUIT ENERGY HARVESTER

(71) Applicant: SOL CHIP LTD., Haifa (IL)

(72) Inventors: Shani Keysar, Haifa (IL); Reuven Holzer, Herzlia (IL); Rami Friedlander, Zichron Yaakov (IL)

(73) Assignee: Sol Chip Ltd., Haifa (IL)

( * ) Notice: Subject to any disclaimer, the term of this patent is extended or adjusted under 35 U.S.C. 154(b) by 426 days.

(21) Appl. No.: 13/827,929

(22) Filed: Mar. 14, 2013

(65) Prior Publication Data

US 2013/0264870 A1    Oct. 10, 2013

Related U.S. Application Data

(60) Provisional application No. 61/622,014, filed on Apr. 10, 2012.

(51) Int. Cl.
  *H02J 1/00*   (2006.01)
  *H02J 5/00*   (2016.01)
  *H02J 7/02*   (2016.01)

(52) U.S. Cl.
  CPC . *H02J 1/00* (2013.01); *H02J 5/005* (2013.01); *H02J 7/025* (2013.01); *Y10T 307/352* (2015.04)

(58) Field of Classification Search
  CPC ............... H02J 3/00; H02J 1/10; H02J 5/005; Y10T 307/352
  See application file for complete search history.

(56) References Cited

U.S. PATENT DOCUMENTS

| | | | |
|---|---|---|---|
| 4,626,983 A | 12/1986 | Harada et al. | |
| 5,504,418 A | 4/1996 | Ashley | |
| 5,929,538 A | 7/1999 | O'Sullivan et al. | |
| 5,982,157 A | 11/1999 | Wattenhofer et al. | |
| 6,029,438 A | 2/2000 | Hosick | |
| 6,104,624 A | 8/2000 | Iwamoto et al. | |
| 6,182,441 B1 | 2/2001 | Hosick | |
| 6,303,457 B1* | 10/2001 | Christensen et al. | 438/396 |
| 6,563,269 B2 | 5/2003 | Robinett et al. | |
| 6,914,411 B2* | 7/2005 | Couch et al. | 320/101 |
| 7,015,563 B2* | 3/2006 | Schmidt | 257/516 |
| 7,227,277 B2* | 6/2007 | Chapman et al. | 307/43 |
| 7,514,899 B2 | 4/2009 | Deng-Peng | |
| 7,830,038 B2* | 11/2010 | Wang | 307/64 |
| 7,919,953 B2 | 4/2011 | Porter et al. | |
| 7,929,325 B2* | 4/2011 | de Rooij et al. | 363/71 |
| 8,106,535 B2* | 1/2012 | Nishimura | 307/80 |
| 8,436,591 B2* | 5/2013 | Dearn | 323/225 |
| 8,482,155 B2* | 7/2013 | Choi et al. | 307/71 |
| 8,614,567 B2* | 12/2013 | Wu | 323/271 |

(Continued)

*Primary Examiner* — Thienvu Tran
*Assistant Examiner* — Pinping Sun
(74) *Attorney, Agent, or Firm* — M&B IP Analysts, LLC

(57) ABSTRACT

A system for energy harvesting comprises a first interface for receiving energy from at least one renewable energy source (ERS); a second interface coupled to at least one load circuit; a third interface coupled to an least one primary energy storage (PES); a DC-to-DC converter connected to one of a single inductor and a single capacitor; a switching circuitry connected to the first, second, and third interfaces and the DC-to-DC converter; a control unit connected to the DC-to-DC converter and the switching circuitry, the control unit controls the system to operate in an operation mode including any one of: provide energy from the ERS to the at least one load via the DC-to-DC converter, charge the least one PES from the at least one ERS via the DC-to-DC converter, and provide energy from the at least one PES to the at least one load circuit via the DC-to-DC converter.

20 Claims, 4 Drawing Sheets

(56) References Cited

U.S. PATENT DOCUMENTS

| | | |
|---|---|---|
| 8,629,386 B2 * | 1/2014 | Bermak et al. ............ 250/208.1 |
| 8,823,210 B1 * | 9/2014 | Olah et al. .................... 307/45 |
| 8,829,722 B2 * | 9/2014 | Kusch et al. .................. 307/82 |
| 2004/0207366 A1 | 10/2004 | Sung |
| 2006/0225781 A1 | 10/2006 | Locher |
| 2007/0108943 A1 | 5/2007 | Kobayashi |
| 2007/0138996 A1 | 6/2007 | Kobayashi |
| 2007/0222410 A1 | 9/2007 | Lee |
| 2009/0039826 A1 | 2/2009 | Yeh et al. |
| 2009/0039852 A1 | 2/2009 | Fishelov et al. |
| 2009/0045781 A1 | 2/2009 | Asbeck et al. |
| 2009/0079385 A1 | 3/2009 | Xiao et al. |
| 2009/0236916 A1 | 9/2009 | Nishimura |
| 2010/0013428 A1 | 1/2010 | Shin |
| 2010/0246230 A1 | 9/2010 | Porter et al. |
| 2010/0264869 A1 | 10/2010 | Dubovsky |
| 2011/0012551 A1 | 1/2011 | Tseng et al. |
| 2011/0031926 A1 | 2/2011 | Bhat et al. |
| 2011/0080135 A1 | 4/2011 | Bland |
| 2011/0111811 A1 | 5/2011 | Juang et al. |
| 2011/0181251 A1 | 7/2011 | Porter et al. |
| 2011/0199040 A1 | 8/2011 | English et al. |
| 2011/0273133 A1 | 11/2011 | Sala |

* cited by examiner

| | Vin | Vout |
|---|---|---|
| PV → Super Capacitor | PV | Super Capacitor |
| PV → Load | PV | Load |
| Super Capacitor → Load | Super Capacitor | Load |

US 9,379,543 B2

INTEGRATED CIRCUIT ENERGY HARVESTER

CROSS REFERENCE TO RELATED APPLICATIONS

This application claims the benefit of U.S. Provisional application No. 61/622,014 filed Apr. 10, 2012, the contents of which are herein incorporated by reference for all that they contain.

TECHNICAL FIELD

The invention generally relates to integrated circuit chips, and more particularly to integrated circuits' energy harvesters and to energy harvesters operative at appropriate time intervals as sufficient energy is harvested.

BACKGROUND

The use of solar energy as a readily available source for energy in general and in particular for the generation of electrical power has now been long established.

Harvesting solar energy in large volumes is done commercially and is increasingly becoming a viable alternative for clean energy. Typically a circuit for harvesting energy is comprised of the solar power cells, such as photovoltaic (PV) cells, a switch voltage regulator, a battery for storing energy, and an appropriate interface for providing energy to the load.

In the related art, various circuits have been proposed for such harvesting solutions and all are concerned with the continuous supply of energy, ranging from the source of energy, to the load, and storing of the excess energy in a battery. The switch voltage regulator typically includes the like of an inductor, a regulator (e.g., a voltage regulator) and capacitors as the case may be. When multiple sources of energy and or batteries are used, multiple regulators are required.

The harvesting solutions discussed in the related art operate well in systems that require a supply of high energy. However, such solutions are deficient when there is a need to supply relatively small amounts of energy to one or more loads from one or more energy sources.

It would be therefore advantageous to overcome such deficiencies by providing a compact solution that preferably is implementable on an integrated circuit (IC). It would be further preferable to reduce the need for multiple internal regulators and relatively large external components such as the inductor.

SUMMARY

Certain embodiments disclosed herein include a system for energy harvesting. The system comprises a first interface for receiving energy from at least one renewable energy source (ERS); a second interface coupled to at least one load circuit; a third interface coupled to an least one primary energy storage (PES); a DC-to-DC converter connected to one of a single inductor and a single capacitor; a switching circuitry connected to the first interface, the second interface, the third interface, and the DC-to-DC converter; a control unit connected to the DC-to-DC converter and the switching circuitry, the control unit controls the system to operate in an operation mode including any one of: provide energy from the at least one ERS to the at least one load via the DC-to-DC converter, charge the least one PES from the at least one ERS via the DC-to-DC converter, and provide energy from the at least one PES to the at least one load circuit via the DC-to-DC converter.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

Figure 1:
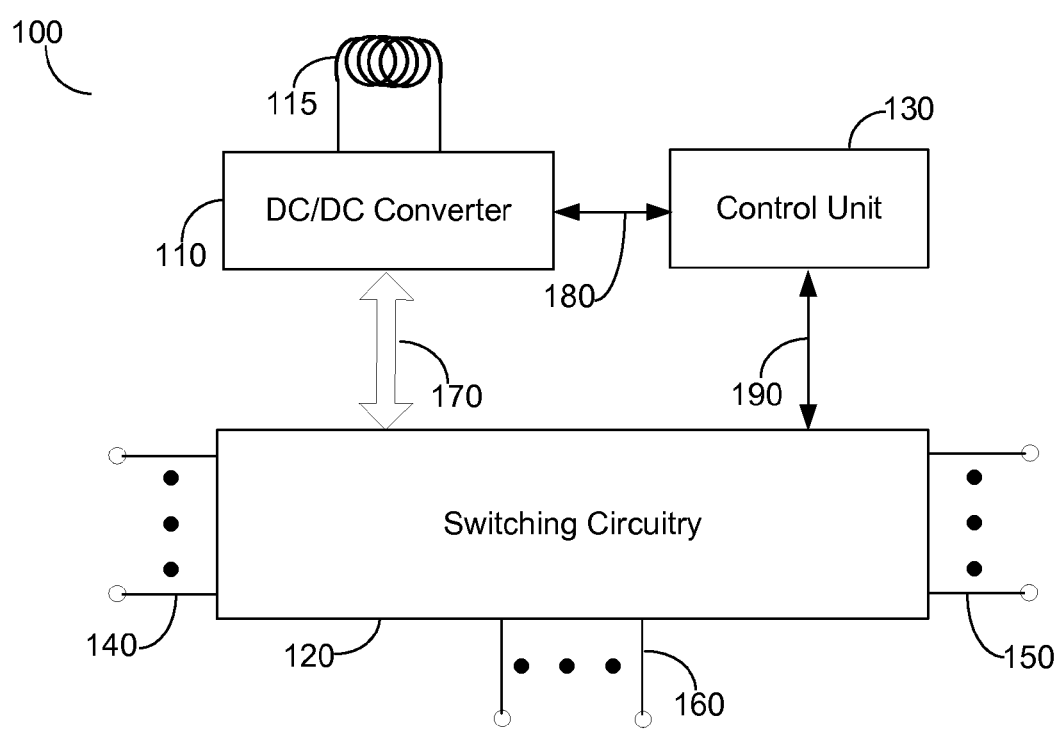
FIG. 1 is a schematic diagram of a system illustrating the operation of the energy harvester according to various embodiments.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein provide an integrated circuit energy harvester that is designed to provide one or more voltages from one or more energy sources such as, but not limited to, photovoltaic (PV) cells. The system includes an interface to one or more energy sources, a single DC-to-DC converter using a single inductor or capacitor, a primary energy storage (PES) and a control circuit that controls switches that connect to the PES for charging at certain periods of time, and switches the PES to load plurality of coupling capacitors to supply loads connected thereto. According to certain embodiments, the energy harvester is designed to support one or more energy sources that support a plurality of load circuits and a PES that stores energy surplus.

FIG. 1 is an exemplary and non-limiting schematic diagram of a system 100 illustrating the operation of energy harvesting according to various embodiments. A switching circuitry 120 is connected to a DC-to-DC converter 110 by connections 170. The DC-to-DC converter 110 may also be referred to as a switching power supply. The switching circuitry 120 (not to be confused with the switching functions of the DC-to-DC converter 110 circuits, which are separate and part of the DC-to-DC converter 110) connects to one or more renewable energy sources (ERSs) through interface 140, one or more PESs through interface 150, and one or more energy loads through interface 160. The ERSs, PESs and loads are not shown in FIG. 1.

The switching circuitry 120 is devised to allow a plurality of modes of operation that include charging the one or more PESs (through the interface 150) from the one or more ERSs; and providing energy to the one or more energy loads (through the interface 160) from the one or more PESs. The system 100 operates under the control of a control unit 130 that interfaces with the DC-to-DC converter 110 via an interface 180 and that further interfaces with the switching circuitry 120 via an interface 190.

In one embodiment, the DC-to-DC converter 110 uses a single inductor 115 selectively coupled to multiple sources and multiple outputs throughout its operation. The a voltage regulator comprises a single DC-to-DC converter 110, having the single inductor 115 is utilized for providing energy to one or more loads from one or more ERSs, examples of which are discussed herein below in greater detail.

An ERS may be, but is not limited to, a photovoltaic (PV) cell. A PES may be, without limitation, a super capacitor, i.e., a capacitor having an unusually large capacitance, or a rechargeable battery. In one embodiment, instead of the single inductor 115, a single capacitor (not shown) is used. The various design considerations as to whether to use a single capacitor or a single inductor are discussed below.

Figure 2:
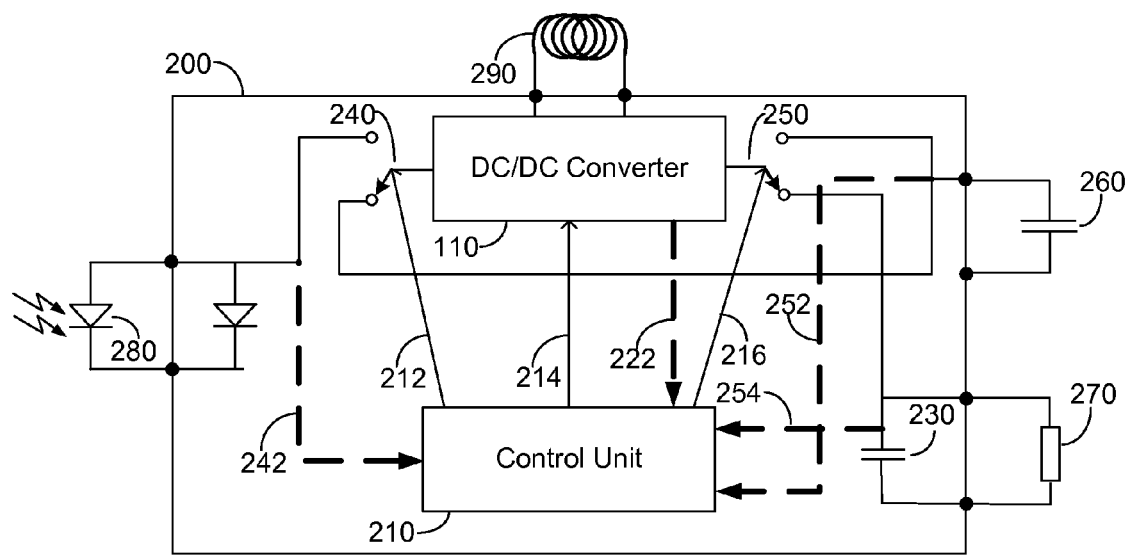
FIG. 2 is a schematic diagram illustrating an energy harvester implemented according to one embodiment.

FIG. 2 shows an exemplary and non-limiting schematic diagram of an energy harvester 200 implemented according to one embodiment. It should be noted that in FIG. 2 the ERS is a PV cell. However, this should not be viewed as limiting the disclosed embodiments, and other sources of renewable energy, such as piezoelectric, wind turbines, etc., may be equally used.

To a DC-to-DC converter 110 there is coupled an inductor 290. Typically, because of the size and current requirements, such an inductor 290 is an external component to the energy harvester 200. A switch 240 connects, in one of its positions, and through an appropriate interface, to an ERS which is a PV cell 280. The PV cell 280 is typically an external component to the harvester 200. However, according to one embodiment, the PV cell 280 may be implemented on top of the integrated circuit having the energy harvester 200, as discussed in more detail in a co-pending U.S. patent application Ser. No. 13/053,610, entitled "Integrated Solar Powered Device", and assigned to common assignee, the contents of which are incorporated herein by reference for all that it contains.

A switch 250 connects in a corresponding position, and through an appropriate interface of the harvester 200, to a PES (through the interface 140 shown in FIG. 1). In an exemplary embodiment, the PES is a super capacitor, 260, which is an internal or external device to the energy harvester 200. The switches 240 and 250 are controlled by a control unit 210, discussed in more detail herein below, using control lines 212 and 216 respectively.

A super capacitor, also referred to as an ultra-capacitor and electric double layer capacitor (EDLC), is a capacitor that has a very large capacitance in a useable size that would otherwise not be reachable in standard capacitor techniques. Capacitance values reaching up to 400 Farads are available in standard case sizes. Such capacitors can therefore store large amounts of energy and hence can be used as a super capacitor. The reason for using such capacitors will be understood as further explanation is provided herein. In an alternate embodiment, a rechargeable battery may be used without departing from the principles of the disclosed embodiments. Furthermore, other ERSs may be used to provide energy to the harvester 200.

In one embodiment, the control unit 210 senses the state of the energy harvester 200 via a plurality of voltage sensing lines 252, 254 and 242, as well as a current sensing line 222. Responsive of the sensed voltage and current levels, the control unit 210 determines the appropriate positions of the switches 240 and 250 for proper operation and further controls the operation of the DC-to-DC converter 220 by a control line 214.

In a first mode of operation, the DC-to-DC converter 110 couples the PV cell 280 to the PES 260 for the purpose of storing the energy therein. In another position of the switches 240 and 250, connection of the PES 260 is provided to a secondary energy storage (SES), e.g., a capacitor, 230. The capacitor 230, that may be on or off of the integrated circuit, is charged by the energy from the PES 260. However, the SES 230 is by far a much smaller capacitor and hence only a fraction of the energy from the PES 260 can be transferred to the SES 230, thereby essentially maintaining the same voltage level of the DC/DC converter 110, before and after the switching takes place. As an example, if the capacitance of the super capacitor that served as the PES 260 is 400 Farads, the capacitance of the capacitor of the SES 230 may be 4 microfarads (µF). The capacitor 230 also acts as a coupling capacitor 230 for a load 270 that prevents voltage surges on the load 270.

The SES 230 is connected to the load 270 that uses the energy stored in the SES 230 for a period of time until the (coupling) capacitor 230 is recharged by the PES 260. The control unit 210 is responsible for cycling through the various modes of operation, and as further explained herein below, to ensure proper operation of the integrated circuit to which the harvester 200 is connected. According to one embodiment, the switches 240 and 250 are controlled by the control unit 210 for the different operational modes that correspond to the appropriate sensing in each mode, as will be described with reference to FIG. 4 below.

While FIG. 2 shows a case of a single energy source, e.g., PV cell 280, and a single load, e.g., load 270, it should be understood that this should not be limiting as to the scope of the disclosed embodiments.

Figures 3, 4:
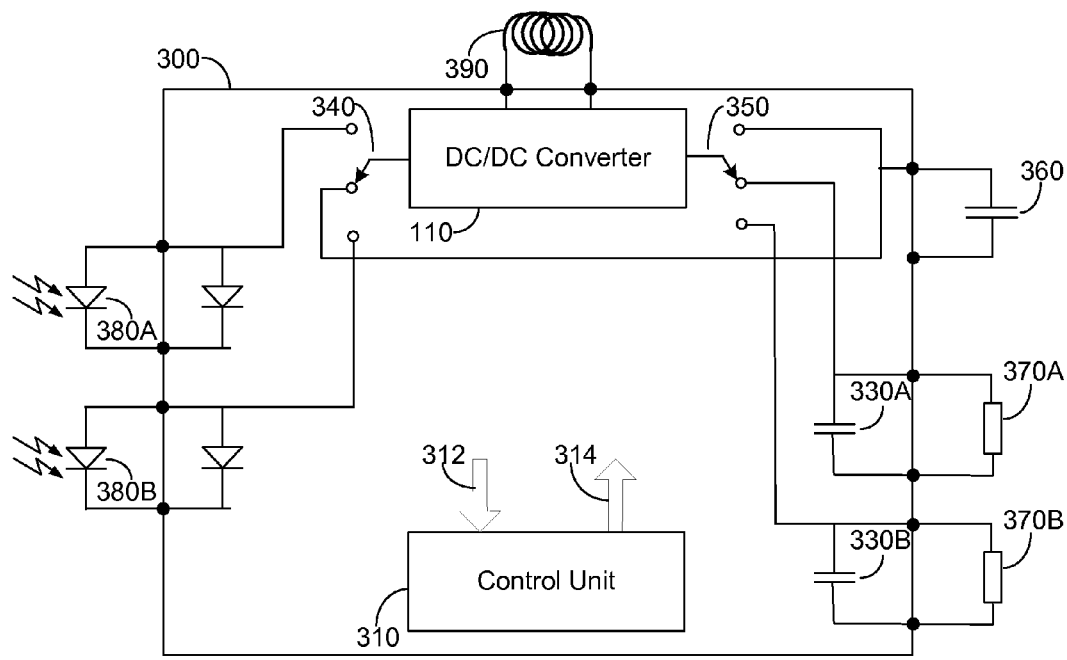
FIG. 3 is a schematic diagram illustrating an integrated energy harvester implemented according to one embodiment.
FIG. 4 is a table describing the respective Vin and Vout sensing in the operation modes of the energy harvester implemented according to one embodiment.

FIG. 3 shows an exemplary and non-limiting schematic diagram illustrating an integrated energy harvester 300 implemented according to another embodiment. The switches 340 and 350 are now extended so as to handle respectively two energy sources, i.e., PV cells 380A and 380B, and two loads, i.e., loads 370A and 370B. Voltage and current sensing as may be appropriate is performed through sensing interface 312, and control of the switches and the DC-to-DC converter 110 is performed by control signals 314.

The operation of a control unit 310 is such that the charging of the PES 360 (e.g., a super capacitor) is performed alternatively from the PV cells 380A and 380B, as well as appropriate switching control to allow the super capacitor 360 to charge SEPs 330A and 330B as may be needed according to the operation schema of the harvester 300. As noted above, the capacitors 320A and 320B can act as coupling capacitors for the loads 370A and 370B, respectively.

It should be appreciated that a general harvester may be implemented without departing from the scope of the disclosed embodiments that would accept N different energy sources, N having integer values and M loads, N and M being integer values greater than 1. It should be further appreciated that the solution provided herein not only allows implementation on an integrated circuit, but also that a use of a single inductor 390 is made possible by the use of the switching techniques discussed herein, thereby overcoming deficiencies of prior art solutions.

In one embodiment, the switches 340 and 350 are controlled by the control unit 310 for the different operational modes that correspond to the appropriate sensing in each mode, as will be described with reference to FIG. 4.

It should be noted that a rechargeable battery can be utilized as a PES discussed in FIGS. 2 and 3. Furthermore, other ERSs may be used as energy sources to the harvesters 200, 300.

FIG. 4 describes an exemplary and non-limiting table of operation of the energy harvester 200, in three different modes: a) the ERS, for example, PV cell 280, is connected to PES 260, e.g., a super capacitor b) the ERS cell, for example, the PV cell 280, is connected to the load, for example, the load 270; and, c) the PES 260, e.g., the super capacitor 260, is connected to the load, for example load 270. Vin in modes a) and b) is the voltage level of a power signal produced by the PV cell, while in mode c) Vin is voltage level of a signal generated in response to discharging of the super capacitor (e.g., PES 260). Vout in mode a) is measured on the super capacitor 260 while in modes b) and c) Vout is measured on the load 270.

Therefore, in a typical implementation of the energy harvesters 200 or 300, as the case may be, there are three modes of operation. In a first mode (mode 'a' discussed above), the ERS, e.g., PV cell 280, charges the PES, e.g., the PES 260. In a second mode of operation (mode 'b' discussed above), the ERS, for example, PV cell 280, is the supply to the load, for example, the SES 230 and corresponding load 270. In a third mode of operation (mode 'c' discussed above), the PES supplies the power to the load, for example, the SES 230 and corresponding load 270.

It should be appreciated that it is necessary to correctly select the ratio between the super capacitor capacitance for effective delivery of energy from the SES to the coupling capacitor, and that of the coupling capacitor that is the SES and respective load, for effective delivery of energy from the coupling capacitor to the respective load. Furthermore, it is necessary that the control unit 210 switches correctly between the different modes of operation as well as selects the appropriate mode of operation for the DC-to-DC converter 110, as further discussed herein below.

Figure 5:
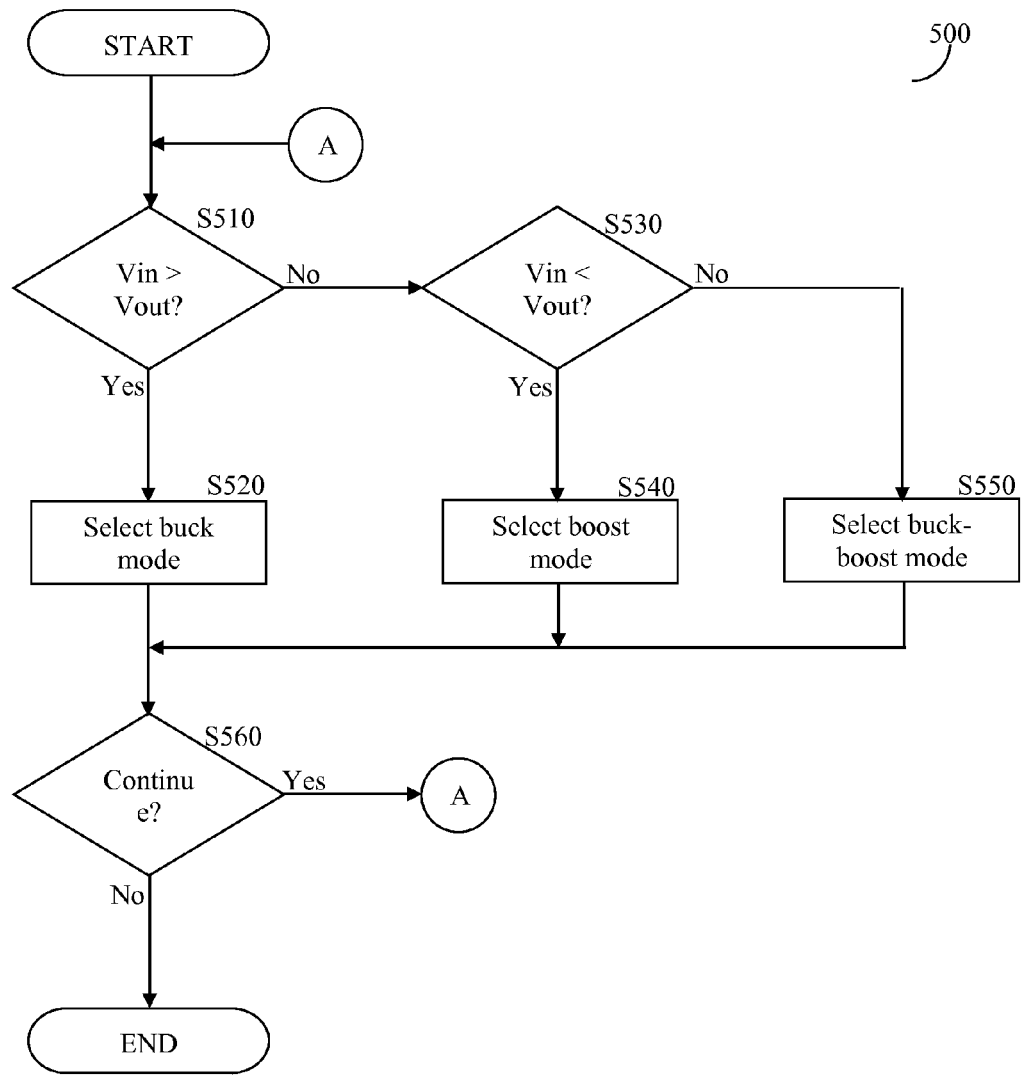
FIG. 5 is a flowchart describing the selection of the operation mode of the energy harvester implemented according to one embodiment.

The sensing of Vin and Vout is used to determine the appropriate operational mode of the circuit, for example, the energy harvester 200, that may be in a buck mode, i.e., step-down conversion, boost mode, i.e., step-up conversion, or buck-boost mode, i.e., operating in a range of output modes that may range from a step-down to a step-up of the output voltage. The determination of which mode to use is described in FIG. 5 that depicts an exemplary and non-limiting flowchart 500. In S510, it is checked whether Vin is greater than Vout, and if so in S520, a buck mode is selected, and continues with S560; otherwise, execution continues with S530. In S530 it is checked whether Vin is smaller than Vout, and if so execution continues with S540, where the boost mode is selected, and continues with S560. Otherwise, in S550, the buck-boost mode is selected and continues with S560. In S560 it is checked whether it is necessary to continue with the sensing of Vin and Vout, and if so execution continues with S510; otherwise, execution terminates.

Therefore the system may operate in one of two possible ways: synchronous and asynchronous. Operating synchronously, a central timer included in the control unit (e.g., units 210 or 310) provides a time slot for each couple of energy source-to-energy destination couple where power charging is conveyed from the energy source to an energy destination. That is, power charging is delivered at predetermined times regardless of the level of power charge or need to provide energy. An analog sensor (not shown), which are coupled to the control unit (e.g., a control unit 110, 210, and 310), alert the control unit if it is to utilize this time slot or not.

In the asynchronous mode, utilization of any energy source to energy destination couple is immediate upon indication from the analog sensor. An analog sensor (not shown) alerts the control unit (e.g., a control unit 110, 210, and 310) that a charge transfer session is required. If more than one similar indication is signaled at the same time, the control unit arbitrates between the sources to prioritize their discharge. In one embodiment, the DC-to-DC converter 110 steps up or steps down the supplied voltage as may be required by a particular load.

Following is an exemplary and non-limiting calculation for a capacitive charge pump implemented as a DC-to-DC converter. Different assumptions may lead to different results, however, the principles remain. For an assumed current of 200 mA, having a ripple of 20 mV at a frequency of 1 MHz, a capacitor, e.g., a PES, can be calculated from the equation $I=C*\Delta V*f$. Therefore:

$$C=I/(\Delta V*f)=10 \text{ mA}/(1 \text{ MHz}*20 \text{ mV})=0.5 \text{ }\mu F$$

A switch resistivity should be less than the value required to charge the super capacitor in less than a half clock cycle. With $T/2=1/(4*\pi*f)=80$ nSec, the resistivity is computed as:

$$Rsw<80 \text{ nSec}/0.5 \text{ }\mu F=0.16 \text{ }\Omega$$

When the switch is implemented on an IC, $U*Cox\sim=80$ uA/V2, Lmin=0.35 u, Vgs=3V, then:

$$W/L=1/0.16/3/80u=\sim26,000$$

where U is the voltage across the switch, Cox is the oxide capacitance of the switch, e.g., a metal-oxide semiconductor field effect transistor (MOSFET), Lmin is the minimal length of the gate of the switch, and Vgs is the gate-to-source voltage of the switch. The area of the switch is therefore $0.35^2*26000$ in the 0.35µ technology node. With an estimated capacitance of a switch at 6 fF/µm^2 the gate capacitance is:

$$Cgate\text{ }sw=0.3^2*26,000*6 \text{ fF}=109 \text{ pF}$$

The current of a single gate toggles once every clock cycle, hence can be computed as:

$$I=C*V*f=109 \text{ pF}*3V*1 \text{ MHz}=\sim0.3 \text{ mA}$$

Therefore, in a case of four switches, e.g., switches 240 and 250 of FIG. 2 that require 4 MOSFETs, the average current would be as high as 1.2 mA.

One of ordinary skill in the art would realize that certain prudent design considerations are required for the exemplary and non-limiting embodiments shown herein. For example, when utilizing an inductor in the DC-to-DC converter implemented by a switching inductor, one capacitor, e.g., PES cannot be shared with all energy sources. In the capacitor case, the capacitor is charged from the PES and discharged to SES respectively. That is, trying to discharge the same capacitor in different voltages of the energy source and/or energy destination, one or more of the sources or destination may further discharge the voltage below that of the first couple, hence, it will degrade the efficiency of the entire system.

In the case of an inductor being coupled to the DC-to-DC converter (e.g., inductor 115, 290, and 390), when the current is charged and then totally discharged and without adding further discharge of any of the energy source and/or energy destination, both voltage ripple and efficiency are not compromised.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention. It should be further noted that certain circuits may be implemented using analog circuits while other may use digital circuits as well as any combinations thereof. Furthermore, it should be understood that a plurality of different kinds of renewable energy sources may be used as inputs without departing from the scope of the invention.

What is claimed is:

1. A system for energy harvesting, comprising:
   a first interface adapted to receive energy from at least one renewable energy source (ERS);
   a second interface adapted to be coupled to at least one load circuit;
   a third interface adapted to be coupled to an least one primary energy storage (PES);
   a DC-to-DC converter adapted to employ in DC-to-DC conversion only one of a single inductor and a single capacitor;
   a switching circuitry coupled to each of the first interface, the second interface, the third interface, and the DC-to-DC converter, wherein the switching circuitry is adapted to couple: the first interface to the DC-to-DC converter, the DC-to-DC converter to the second interface, and the DC-to-DC converter to the third interface; and
   a control unit connected to the DC-to-DC converter and the switching circuitry, wherein the control unit controls coupling made by the switching circuitry, so that when operating the system operates in a mode including at least one of: providing energy from the at least one ERS to the at least one load circuit via the DC-to-DC converter, charging the least one PES from the at least one ERS via the DC-to-DC converter, and providing energy from the at least one PES to the at least one load circuit via the DC-to-DC converter;
   wherein the control unit is configured to determine the operation mode based on at least one of: a current level at the DC-to-DC converter level, a voltage level at the at least one ERS, and a voltage level at the at least one PES; and
   wherein the DC-to-DC converter is configured by the control unit to operate in a buck mode when the voltage level at the least one ERS is larger than the voltage level at least one PES.

2. The system of claim 1, wherein the system is embodied within a single integrated circuit (IC).

3. The system of claim 2, wherein the at least one ERS is integrated in the integrated circuit (IC).

4. The system of claim 1, wherein the at least one load circuit is coupled to a secondary energy storage (SES).

5. The system of claim 4, wherein the SES is a coupling capacitor.

6. The system of claim 4, wherein the SES is any one of: an external capacitor and an on-chip capacitor.

7. The system of claim 4, wherein the control unit is configured to determine the operation mode by sensing a voltage level of the SES.

8. The system of claim 1, wherein the at least one PES is any one of a super capacitor and a rechargeable battery.

9. The system of claim 1, wherein the at least one ERS comprises photovoltaic (PV) cells.

10. The system of claim 1, wherein the DC-to-DC converter is configured by the control unit to operate in a boost mode when the voltage level at the at least one ERS is smaller than the voltage level at the at least one PES.

11. The system of claim 10, wherein the DC-to-DC converter is configured by the control unit to operate in a buck-boost mode, when the buck mode and the boost mode are not operative.

12. The system of claim 1, wherein the switching circuitry is adapted to respectively couple each of the first interface to the DC-to-DC converter, the DC-to-DC converter to the second interface, and the DC-to-DC converter to the third interface at different times.

13. The system of claim 1, wherein the switching circuitry, when performing the coupling, couples each of the first interface to the DC-to-DC converter, the DC-to-DC converter to the second interface, and the DC-to-DC converter to the third interface during a different respective one of available time slots.

14. The system of claim 1, wherein the controller, when operating, provides time slots during which there is a coupling an acting energy source to an acting energy destination, wherein during ones of the time slots the acting energy source is any one of: the at least one ERS and one of the at least one PES and during ones of the time slots the acting energy destination is any one of: the at least one PES and the at least one load circuit.

15. A system for energy harvesting, comprising:
   a first interface adapted to receive energy from at least one renewable energy source (ERS);
   a second interface adapted to be coupled to at least one load circuit;
   a third interface adapted to be coupled to an least one primary energy storage (PES);
   a DC-to-DC converter adapted to employ in DC-to-DC conversion only one of a single inductor and a single capacitor;
   a switching circuitry coupled to each of the first interface, the second interface, the third interface, and the DC-to-DC converter, wherein the switching circuitry is adapted to couple: the first interface to the DC-to-DC converter, the DC-to-DC converter to the second interface, and the DC-to-DC converter to the third interface; and
   a control unit connected to the DC-to-DC converter and the switching circuitry, wherein the control unit controls coupling made by the switching circuitry, so that when operating the system operates in a mode including at least one of: providing energy from the at least one ERS to the at least one load circuit via the DC-to-DC converter, charging the least one PES from the at least one ERS via the DC-to-DC converter, and providing energy from the at least one PES to the at least one load circuit via the DC-to-DC converter;
   wherein the control unit is configured to determine the operation mode based on at least one of: a current level at the DC-to-DC converter level, a voltage level at the at least one ERS, and a voltage level at the at least one PES; and
   wherein the DC-to-DC converter is configured by the control unit to operate in a boost mode when the voltage level at the at least one ERS is smaller than the voltage level at the at least one PES.

16. The system of claim 15 wherein the system is embodied within a single integrated circuit (IC).

17. The system of claim 15, wherein the at least one load circuit is coupled to a secondary energy storage (SES) and wherein the control unit is configured to determine the operation mode by sensing a voltage level of the SES.

18. The system of claim 15, wherein the at least one ERS comprises photovoltaic (PV) cells and wherein the at least one ERS is integrated in the integrated circuit (IC).

19. The system of claim 15, wherein the switching circuitry is adapted to respectively couple each of the first interface to the DC-to-DC converter, the DC-to-DC converter to the second interface, and the DC-to-DC converter to the third interface at different times.

20. The system of claim 15, wherein the switching circuitry, when performing the coupling, couples each of the first interface to the DC-to-DC converter, the DC-to-DC converter to the second interface, and the DC-to-DC converter to the third interface during a different respective one of available time slots.

* * * * *